Oct. 15, 1968 M. D. McFARLANE 3,406,383

ANALOG KEYED PHASE TRANSMITTER AND SYSTEM

Filed Aug. 21, 1964 3 Sheets-Sheet 1

INVENTOR.
MAYNARD D. McFARLANE

BY

Browne, Schuyler, & Beveridge
ATTORNEYS

INVENTOR.
MAYNARD D. McFARLANE

BY

Browne, Schuyler, & Beveridge
ATTORNEYS

ANALOG KEYED PHASE TRANSMITTER AND SYSTEM

Filed Aug. 21, 1964 3 Sheets-Sheet 3

INVENTORS
MAYNARD D. McFARLANE
BY
Browne, Schuyler & Beveridge
ATTORNEYS

United States Patent Office 3,406,383

Patented Oct. 15, 1968

3,406,383
ANALOG KEYED PHASE TRANSMITTER AND SYSTEM

Maynard D. McFarlane, San Diego, Calif., assignor to Robertshaw Controls Company, Richmond, Va., a corporation of Delaware Filed Aug. 21, 1964, Ser. No. 391,200
4 Claims. (Cl. 340—207)

This invention relates generally to transmission of analog information by incremental phase shifts of a carrier wave and more particularly to remote registration of quantitative data at high speed within narrow carrier band width limitations.

Patents Nos. 3,112,448, 3,119,964 and patent applications Ser. No. 69,878 by Cecil A. Crafts, filed Nov. 17, 1960, now Patent No. 3,157,740, and Ser. No. 235,918 by Cecil A. Crafts et al., filed Nov. 5, 1962, now Patent No. 3,257,508, disclose basic systems of transmission and reception of information by means of phase-shifted carrier waves generally within narrow band pass limits governed by the rate of keying of the carrier by a binary keying signal. The first and second of these cases disclose selection from three or more allocated phase angles of a fixed frequency wave a particular phase for each information bit. In order to resolve ambiguities in a phase-shifted carrier a third or fifth phase position, "forbidden" according to the second case, is used to automatically cause synchronization at the receiver, the mark and space signals then corresponding with the mark and space signals ordering the phases at the transmitter. The third case discloses additional logic circuitry including ring counter apparatus for selecting at the transmitter and registering at the receiver a desired degree of phase shift without reference to the absolute phase angle instantly transmitted. The fourth referenced case discloses a simplified technique for transmission by phase shift, and reception by frequency shift-type detection, of a signal which is then converted to the same binary form as was employed in the phase-shifting operation at the transmitter, this system being effective to register each shift, without synchronization or logic circuitry, to recover the direction of phase shift employed, and, with optional means for phase-shift resolution, to register multiple phase-shift magnitudes.

These and other examples of the prior art of phase-shift communication are particularly adapted to the transmission of binary information either in simplex, diplex, or triplex form. In accordance with the existing state of the art, the inherent superiority of phase shift or discrete phase transmission techniques over corresponding systems of frequency shift communications has now received recognition. Significant advantages related to the improved signal-to-noise ratio obtained in the system of the referenced patents and applications are notable. Such systems of transmission and reception of digital information have generally been of mark-space or binary type of signalling and have not been adaptable readily to the transmission of signals of continuously variable magnitude such as shaft rotation data, radar position indication as on a PPI scope, varying temperature, pressure, altitude, or process information, and the like. Most previous phase-shift communication systems have employed phase reversal or phase quadrature with problems of phase ambiguity. Two of the referenced patents employ an odd number of allocated phase positions wherein the information is in the form of the particular phase instantaneously transmitted, one not being used, to permit resolving the ambiguity. Various phase-shift techniques, as in the case of the last application referenced, are essentially binary and capable only of sending mark and space indications, continuously changing data transmission by the efficient phase-shift modulation being not transmitted by phase keying techniques.

For transmission of quantitative data it has previously been the practice to use variable amplitude or frequency modulation or to employ some type of a converter for changing analog data into binary data with a considerable resulting complexity and reduction in rate of transmission permitted by such a system. An example illustrating data digitizing is found in Patent No. 3,024,990. No simple means for direct data transmission by phase-shift techniques has been available for data in analog form.

It is accordingly an object of this invention to provide a means for directly modulating a low-frequency carrier or subcarrier in discrete increments of phase whereby direction, speed and amount of rotation of a shaft or movement of an arm may be transmitted for reception by simple detection methods.

Another object of the invention is to provide an improved method of communicating analog data.

A further object of the invention is to provide a phase modulated wave representative of the instantaneously varying value of a quantity sensed in the vicinity of the transmitter.

A still further object of the invention is to provide an improved system of servo motor drive and control by phase modulation of a carrier wave.

These objects are achieved, in one example, by the use of phase shifts of transmission in which at least three equally spaced phase allocations or positions are employed, each ordered in a sequence of adjacent phase positions, and reveribte at will, to provide a single frequency of transmission exhibiting phase shifts selected to represent either total quantity change or steps per second to represent a rate of change of the quantity. A single frequency will usually be sent, modulated only in discrete and constant phase angles relative to the oscillator. For example, an asynchronous system may be used in which only the times and directions of phase shifts need be known. In such a system the transient effects (as the phase is altered) convey the intelligence for reception, recording or utilization, by simple integration of axis-crossing time signals, although more involved logic circuits may be used for recovery of the phase information. In addition, the present invention may utilize one of the synchronous transmission and detection systems of the referenced prior art.

Essentially, the transmitter counts according to the instant total of a quantity and the receiver counts increments of phase change ordered at the transmitter, to give analog data or a total in analog form even though transmitted as mere selections from two or more allocated phase steps of a fixed frequency wave. For each bit duration a phase remains fixed relative to the generated phase and frequency, and each succeeding bit has mark or space phase throughout. The transmitted frequency is not altered, and very narrow band filters may be used at both ends of the transmission link. The entire bit length, i.e., one baud, is available to establish a new phase and permit high speed transmission.

Other features and advantages of the invention will be apparent by consideration of the description and drawings in which.

Basically, the present invention operates to achieve analog data communication by phase shift transmission at a single constant frequency and by detection at the receiver of successive phase shift occurrences with output added according to the direction and time of shift. There is no dependence upon synchronism between transmitter and receiver phases. The system is capable of operating with a variety of modulator and demodulator circuits, either in a two phase or a three phase system, though it is not limited thereto.

A simple embodiment utilizes a voltage controlled oscillator (VCO) to produce a desired constant phase shift when ordered, not a variable phase shift, thus to produce a phase stepped wave, one step for each DC incremental signal in the input to the keying circuit.

An analog data system according to this invention may operate with only two phases required, as in patent application Ser. No. 235,918, above noted, provided that the receiver is of the type which responds to directions of phase shift and provides from one direction a negative output pulse and from the other direction a positive output pulse. It is not necessary that the phases be identifiable or that each phase shift bear any definite relationship to a whole cycle when data input is a succession of discrete similar phase shifts timed according to a rate of change and reversed in sign according to data changes of the opposite sign.

However, when apparatus responding to repeatable particular phase shifts such as 120° is utilized a suitable form of keying is required to produce shifts each bearing some predetermined relation to the generated wave at the transmitter. The receiver need not operate synchronously or determine any absolute phase relationship.

Figures 1, 2:
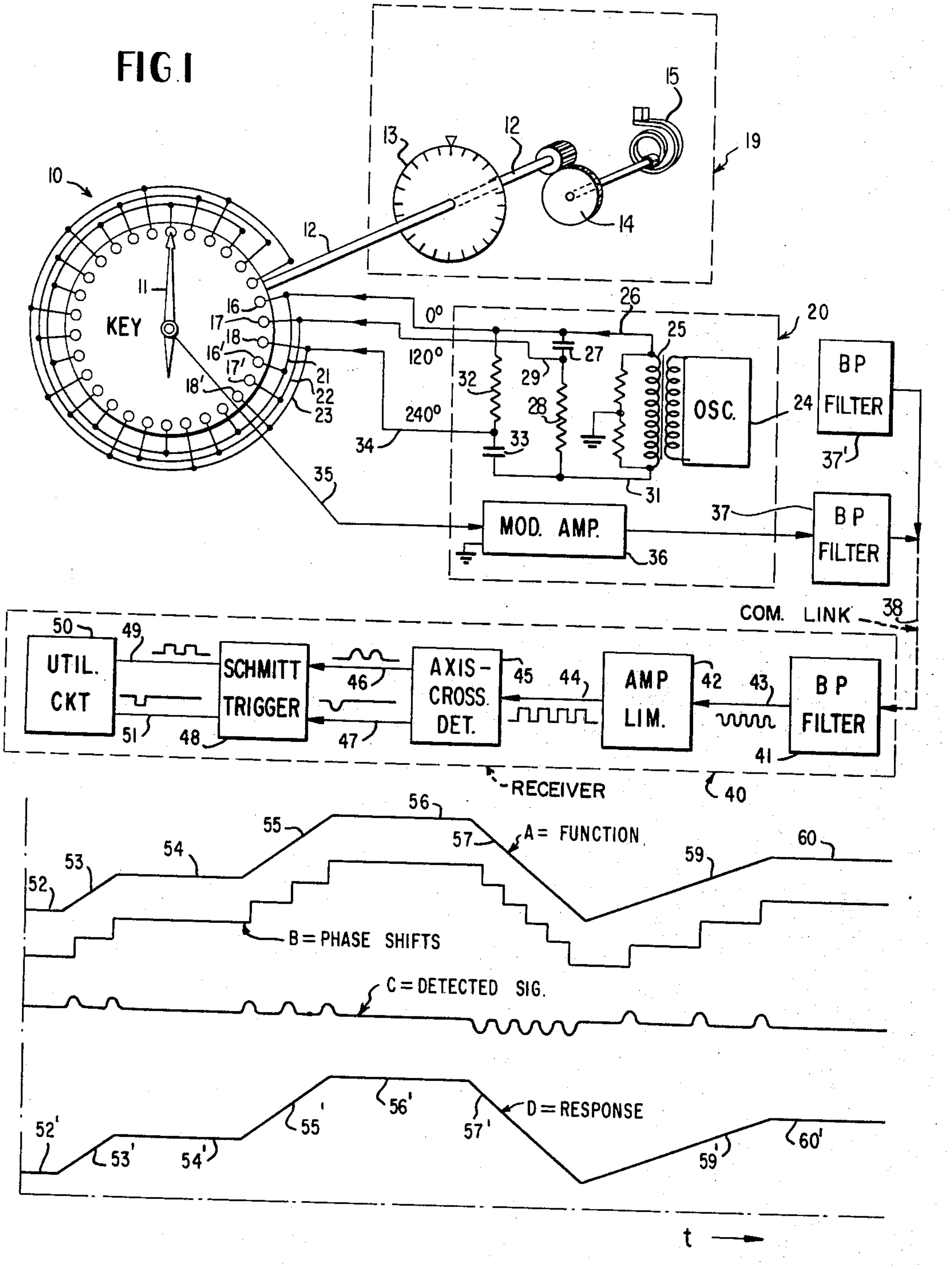
FIG. 1 illustrates application of the invention to remote registration of a variable represented by shaft rotation.
FIG. 2 illustrates in schematic wave form essential steps in the communication and receipt of analog information according to this invention.
Figure 3:
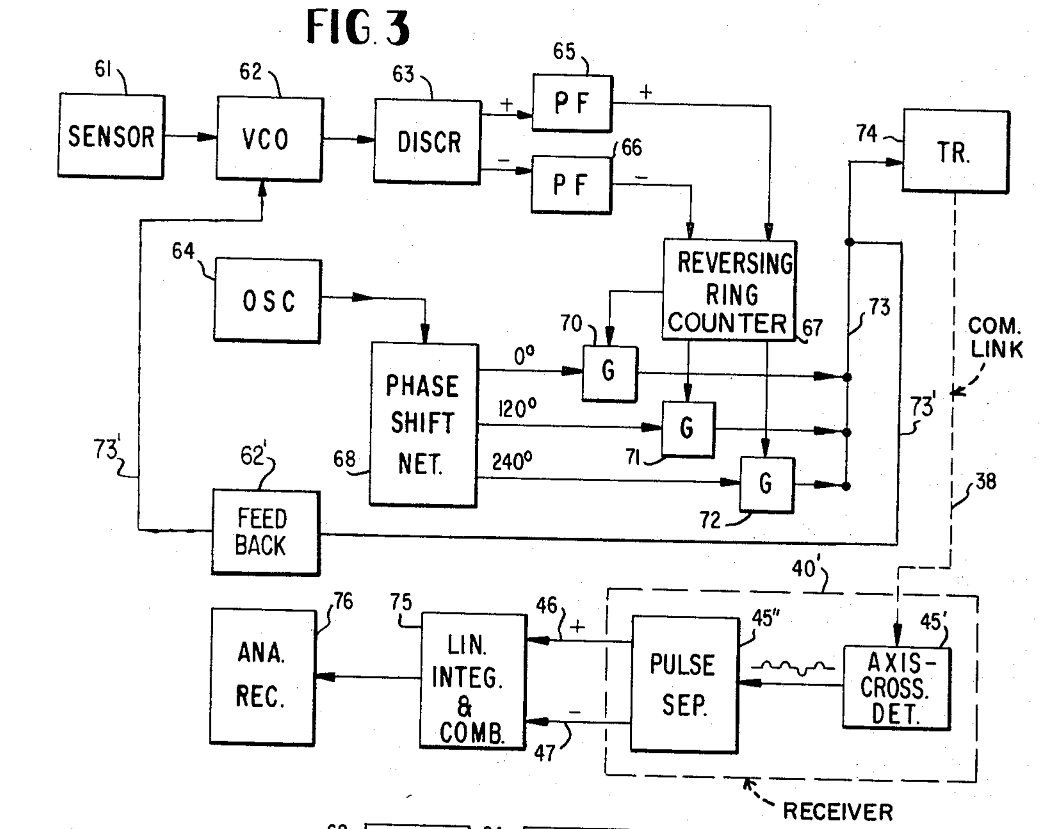
FIG. 3 illustrates application of the invention to the remote indication of varying quantitative data represented in electrical signals at the transmitter input and at the receiver output of the system.

FIG. 1 shows one arrangement in which analog information may be automatically keyed and transmitted as 120° phase shifts, while FIG. 3 illustrates a similar system somewhat more generally to include control by a VCO with a reversing ring to effect progressive phase selection. A keying device is illustrated at 10 as having a rotary contact arm 11 mounted on input shaft 12 by which it is driven in rotation in accordance with a quantity indicated as shaft position. This shaft is illustratively controlled by a drive device 14 operating to indicate pressure, temperature as in a bourdon tube, or the like, to provide the desired degree of rotation according to ambient or process information to be forwarded to the receiving station. The arm 11 forms a movable element of a switch in which a number of contact points such as 16, 17 and 18 are arranged preferably at uniform intervals around a circle concentric with the shaft 12. As illustrated in this figure, successive contact points taken around this circle in a clockwise direction as at 16, 17 and 18 are connected in three circuits to a modulation-controlling apparatus generally indicated at 20. Positioning of shaft 12 may be controlled by data from any other source, as shown generally at 19.

When it is desirable to communicate a number of significant figures to convey quantity information, a keying device 10 is arranged such that the desired number *n* of contact points may be represented as at 16, 17 and 18, etc., these being repeated around the circle as many times *m* as may be desired to represent the quantity in the desired accuracy of shaft rotation, illustrated according to the number of divisions for the reading of the dial 13. Alternatively, only *n* points might be used so long as recontacting thereof is provided in the same directional sense as many times as needed for representing the digitary quantity. Three distinct phase conditions suffice to represent any quantity which may be displayed on the shaft 12 and to distinguish additive from subtractive movements of shaft 12. Adjacent contacts 16′, 17′ and 18′ are illustrated as connected to contacts 16, 17 and 18, respectively, by shorting bars 21, 22 and 23 to establish three circuits, one for each 120° phase of carrier to be selected. These bars connect together corresponding contact points within each of the three circuits. Each contact in each of the *m* sets is reached by the arm 11 as it is rotated by shaft 12.

An output line 26 connects to one of the interconnected sets of terminals such as 16 to provide a fixed phase, here assumed to be of zero phase. Between the line 26 and the opposite oscillator output terminal at line 31 there is provided a capacitor 27 and resistor 28 whereof the junction is connected by line 29 to the shorting bar 22 to interconnect all contact points corresponding to the point 17. When the oscillator 24 is provided with a center-grounded output impedance 25 including output lines 26 and 31 the voltage on line 29 will, according to conventional practice, represent a phase which leads the phase of the oscillator 24 by 120° if elements 27 and 28 are properly selected. Similarly, a reversed series combination of resistor 32 and capacitor 33 is connected between lines 26 and 31 and has an output at the junction therebetween connected by way of line 34 to shorting bar 23 which interconnects all contacts corresponding to contact 18. A five phase system would have two additional sets of contacts in the ordered sequence, connected to appropriate phase shift components to give 72° phase steps as the arm 11 is rotated continuously in one direction or the other.

It will now be apparent that as the arm 11 rotates in the clockwise direction in a three phase system it passes in succession from the zero degree to the 120° and thence to the 240° phase positions relative to the fundamental phase generated in the oscillator 24. As the arm 11 is rotated further it will contact points 16′ and 17′, etc., thus to continuously advance the phase of the wave connected by the arm 11 as output with respect to the steady phase at the fundamental frequency of the oscillator 24. It will also be evident that counterclockwise rotation of the arm 11 will produce phase shifts of the lagging type, in which a shift of one-third cycle occurs for each movement of the contact arm 11 counterclockwise from any one contact to the next. A five phase system would operate by one-fifth cycle increments which would be positive or negative in direction according to the direction of rotation of arm 11. For this purpose, additional phase shift elements would be added to produce the 4th and 5th of each of *n* steps. The keying device 10 is supplied with an output at line 35 connected to arm 11 to select a particular phase of the oscillator 24 to transmit at any particular instant. The absolute phase is not important, but any change in phase is readable by steps either in total quantity or in rate. Oscillator output of the instantly ordered phase is then taken, preferably by way of modulation amplifier 36 and band pass filter 37 to fixed frequency communication link 38, thence to a receiver generally illustrated at 40.

With the apparatus thus described it will be understood that a phase shift occurs as often as arm 11 sweeps from one contact position to an adjacent contact position and that the phase transmitted will be advanced or retarded in accordance with the direction of the rotation of the arm 11. If it should be desired to send quantity data such as the numeral +96 the arm 11 would be driven to the 96th contact position taken in a clockwise direction from a selected zero or resting position, and the numeral 96 thus transmitted as 96 phase shifts of the carrier in one marking sequence. If the arm 11 traverses thirty contact points per revolution and each shift is 120° a single rotation of the arm 11 would represent ten complete cycles of phase shift taken one-third cycle at a time.

The receiver detects these shifts of phase as a leading shift, otherwise described as an advanced phase shift, for each of the contact points traversed, and 96 phase shifts would require 3.2 revolutions of arm 11. A recording or utilization circuit reads the 96 events in the marking sequence and uses them in any way desired to show the quantity +96. The choice of 120° shifts is exemplary. A simple multiple of 36° might have been selected so that a single rotation of dial 13 would produce a digital value of 10, or a suitable decade multiple. Also, the phase interval might be 2 radians to give maximum signal-to-noise response, and the dial steps could be selected accordingly where decade representation is not needed, or when each shift resets the base line of measurement to a new value independent of previous base lines or arbitrary zeroes.

Figures 5, 6:
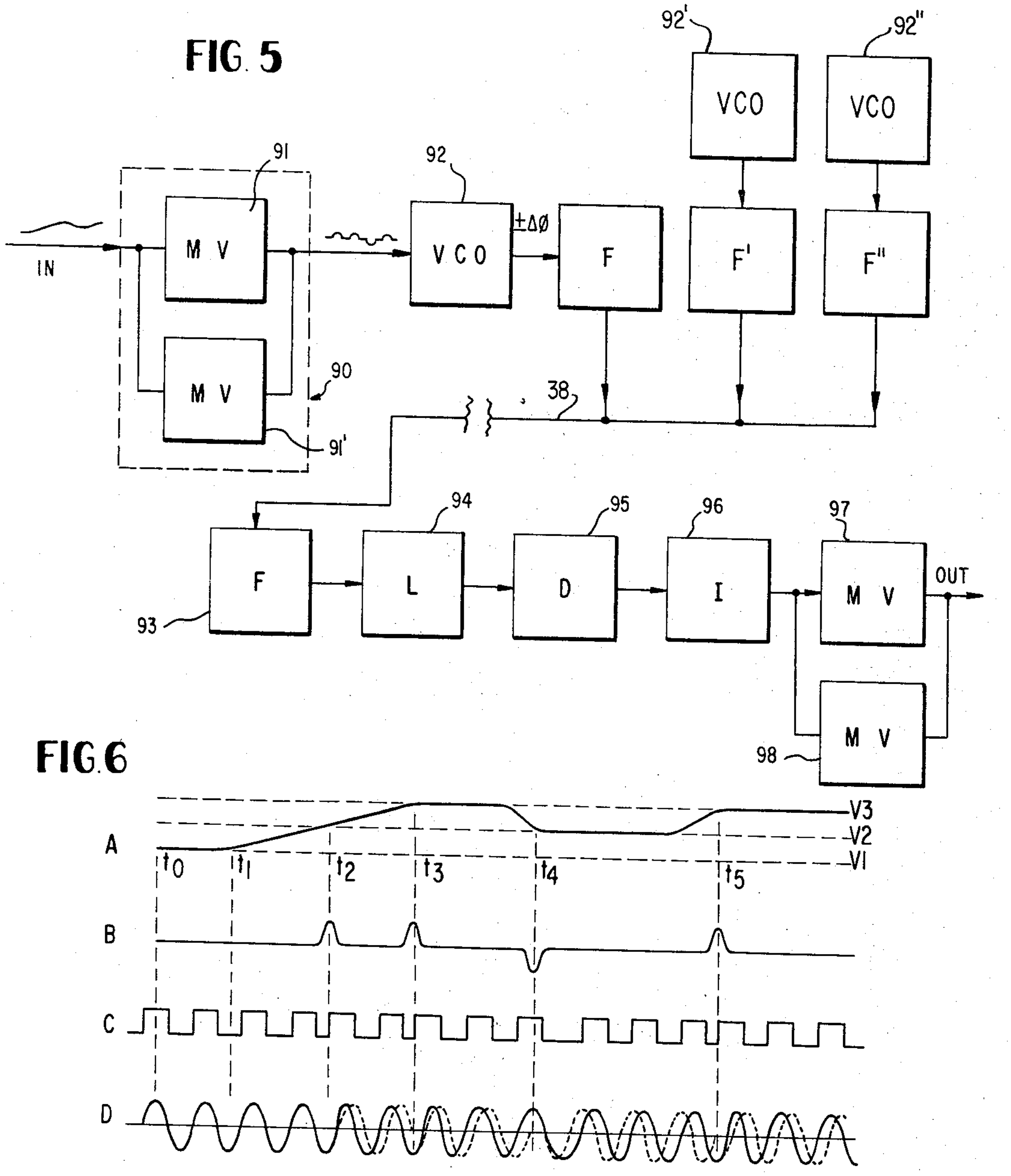
FIG. 5 illustrates in a block diagram a simplified analog data transmission system where the phase shift need not be an integral fraction of a cycle.
FIG. 6 illustrates features of FIG. 5.

A phase shift control or switch such as 10, when driven in accordance with analog data produced by the source 19, modulates the transmitter 20, which has an output at fixed frequency except for those transient shifts which result from phase keying. The phase keyed carrier remains within very narrow frequency band widths governed by the keying rate or number of bits per second which may thus be transmitted over any suitable link 38 to receiver 40. Link 38 may be a voice-band telephone line on which a considerable number of simultaneous messages are multiplexed at different fixed frequencies. Alternatively, one or more channels might be included on one line at a much higher bit rate. Other types of modulation to convey the phase shift information may, of course, be employed. The communication link may also be by radio in which a low-frequency carrier is phase-modulated and then becomes a subcarrier used for modulation of the radio frequency carrier, according to conventional arrangements. FIG. 5 illustrates a variable number of modulated carriers multiplexed together on link 38.

Receiver 40 (40' as shown in FIG. 3) demodulates the phase-modulated fixed-frequency wave after separation of the channels multiplexed together. The receiving apparatus may be a simple axis-crossing rate detector and may consist essentially of a band pass filter 41 feeding an amplitude limiting stage 42 by way of line 43, which stage may comprise preferably three of four stages of amplitude limitation and amplification so that the received wave is then represented in the line 44 as a series of sharp axis-crossings, one for each axis crossing of the phase-modulated carrier wave as received, or as derived from the high frequency wave by which it is modulated in radio transmission. In the absence of a phase shift these axis crossings are, of course, regular and equally spaced. Each phase shift in the transmitted wave changes the axis-crossing interval which is utilized in detector 45 to develop in one or more cycles a pulse of DC voltage (or current) which is positive during the transient interval of decreased period occurring at the instant of a forward shift in phase and negative during any interval of increased periods corresponding to the instant of phase retardation at the transmitter. A preferred type of receiver responds only to changed timing from a regular periodicity of axis crossings. Such changes may occur in one wave period, but usually are extended to several periods. The receiver does not detect or register any different frequency or phase as such, since only the advance or retardation of phase is detected. When a fixed frequency is phase-shifted only, no different frequency from the fixed frequency transmitted is recognizable. However, a result similar to a transient frequency shift is seen in the output of limiter 42 as an altered time of axis crossing at the instant of the selection of a new phase, persisting only until the new phase of transmitted wave has asserted itself in the communication link. Since no different frequency is recognizable, such a phase departure technique is not a frequency modulation. It is the establishment of the fixed shift of phase that is effective at the transmitter, whereas in frequency shift keying there may be an exact return to the same phase, or to any other unknown phase, the phase being uncontrolled.

By reference to FIG. 2, basic operations involved in processing phase-shift signals may be seen. Output from detector 45 is a DC voltage varying only during the phase transients, and may be a set of positive voltage excursions each corresponding in time to particular positive phase shifts at the transmitter or a set of negative voltage excursions corresponding to phase retardations at the transmitter, or combinations of both as shown line C of FIG. 2. Output from detector 45 may be fed to a trigger or pulse-forming circuit 48. Trigger circuit 48 is designed to convert voltage or current pulses as represented in line C of FIG. 2 into sharply formed pulses, similar when summed to those illustrated at B in FIG. 2. The Schmitt trigger is a suitable pulse shaping circuit because of its simplicity and accuracy of representing positive and negative excursions of voltage in the form of sharply defined switching voltages (or currents) suitable for feeding to a utilization circuit 50. Utilization circuit 50 may be a recorder for summing the output from lines 49 and 51 from the Schmitt trigger or may include any conventional integrating circuitry such that the staircase type of output corresponding to line B of FIG. 2 is converted into a response curve A of FIG. 2, illustrative of an analog function initially impressed upon the sensing apparatus 19 of the system.

It will be appreciated that band pass filters 37, 37' and 41 serve dual purposes in selecting a desired signal and preventing adjacently multiplexed waves from spilling over into the channel selected for the particular receiver considered. Since the phase shift information is all represented in the phase transient which occurs at the instant of shifting of the phase of the oscillator output it would be anticipated that the transient would contain frequency components which spill over into adjacent channels. The band pass filters prevent such spill-over from one channel into another, and confine the energy received to that which is useful in the detection of a phase shift in one direction or the other. The signal-to-noise ratio in such a receiver is improved in that the band pass filter controls maximum deviation in the transient so that the shift of phase continues over a few cycles of the fixed frequency employed, such as six cycles. Frequency limits of plus or minus 5 percent may be set for the filters. While no definite frequency may be assigned to the electromagnetic wave during transition to a different phase of the carrier wave, it is conventionally presumed that the duration of the transient is inversely related to the pass band of the filter.

Where data is not in the form of shaft rotation but is a varying quantity, such as a voltage varying with relation to some arbitrary base line, a different form of data selection and keying may be used. Apparatus to select keying signals for a digital system from analog data is well known and need not be described here in detail, but here operates to provide a single phase shift keying signal whenever a departure from the value at the last keying occurs, in either direction, and the value which is present at the time of keying becomes the new zero from which the next data increment is measured. Thus, if the quantity 6 has already been transmitted and is followed by a unit negative departure a "−1" phase signal is effected. Any further change of magnitude is similarly measured from a newly set arbitrary zero corresponding to 5 on the scale of the original data base. It has the advantage of not requiring mechanical adjustments or rotations, while output is a numerical count suitable for direct processing or numerical recording at both ends of the transmission link. Each change from the prior value is unitary and discrete, but of either sign, to provide an exactly integrated total of the data in graphable form. It has a further advantage in simplicity of transmission since there is no need for phase shifts of the transmitted wave to bear any particular relation to a whole cycle, although shifts of $$\pm\frac{360°}{\pi}$$

are preferred to ⅓ cycle or ½ cycle since the signal-to-noise ratio is generally enhanced thereby. Thus a mark signal may be an advancing phase shift and a space signal a retarding phase shift, of any constant amount. The receiver registers the integrated total change or the difference between the number of mark and space signals received being measured from any selected time zero, and thus a countable binary sum.

Operation as described is shown in FIG. 2 where line A represents the data to be transmitted. As illustrated, it has a portion 52 during which no phase shift occurs because no change in data has occurred. Illustrated at 54, 56 and 60 are other intervals during which no change of data is to be transmitted. At 53 the function is shown rising voltage-wise at a first rate, and again at the portion 55. At 57 is illustrated a higher rate of change, in this instance the quantity to be represented decreasing, to produce a steeper slope for the portion 57 than for the portions 53 and 55. Also at 59 is illustrated a slower rising function, represented in line B as fewer phase shifts per second. Such a progressive or analog data stream may represent a changing shaft position. Other values not associated with shaft rotation of course may represent the value of the function 53 in terms of multiples of an increment of phase shift, varying in total or rate in accordance with the function A. Curve C represents the receiver's combined output as present in lines 46 and 47 of FIG. 1. Each voltage excursion in line C represents a single transmitter phase shift occurring as arm 11 moves from one to another contact on switching device 10. In B and in C the number of steps shown could be used for very small changes if desired for greater fidelity. Curve D is the response curve representative of the function A when the signals of line C have been cumulatively added to produce a repeater shaft rotation, or a voltage signal.

FIG. 3 illustrates an electrical equivalent of the apparatus of FIG. 1 in which the sensor 61 corresponds to the sensor or data source 19 of FIG. 1. Sensor 61 has an electrical output of variable voltage to a suitable converter, which may include an astable multivibrator operating to give a phase-shifted output for each bit, or a voltage controlled oscillator 62 with associated feedback circuitry 62' (shown in dotted outline) to convert a varying voltage to phase pulses in proportion to the analog variation of voltage. A voltage-sensitive relaxation oscillator of conventional type may perform the function of the multivibrator. When device 62 is a voltage controlled oscillator it may be operated to produce a shift which varies in proportion to the magnitude and direction of the voltage output from sensor 61. Such a variable frequency output is not transmitted according to this invention but is employed in a discriminator to resolve an analog quantity in terms of discrete phase-shift qunatities. The variable frequency thus produced is taken to a discriminator 63 which produces a positive or negative output upon a predetermined departure from a datum base. Discriminator 63 may also operate by comparison with a fixed frequency from oscillator 64 to produce a positive or negative output signal. Whenever the output voltage departs from a datum base by a value selected to initiate a phase signal as determined by pulse formers 65 and 66, respectively, which may be Schmitt triggers, a positive or negative voltage pulse is produced to control the conducting position within a ring counter circuit, as in reversing ring 67, which may be advanced by positive pulses and moved backward by negative pulses. The reversing ring and gating illustrate progressive phase changing at repreated exact phases.

The output of a stable oscillator 64 is taken to phase shift network 68 illustratively having a number of outputs according to the phase steps in a cycle, three phase positions being illustratively selectable, as in FIG. 1. Gate circuits 70, 71 and 72 are each connected to be operated exclusively and in accordance with the selected output of the reversing ring 67, and each gate so enabled selects one of the phase outputs from the phase shift network 68 for transmission by way of combining line 73 and transmitter 74. In place of reversing ring 67 and gates 70, 71 and 72 the output of pulse former 66 might order a phase shift in one direction whenever received, and the output of 65 an opposite shift.

Apparatus according to FIG. 3 is the equivalent of the apparatus of FIG. 1 in that a quantity is first sensed and then mechanically or electrically represented as a number of phase shifts selected at time $T_2$ to represent a different quantity than was sensed at time $T_1$. No mechanical position representation is needed in the apparatus according to FIG. 3, which converts analog voltage to pulses of one or the other sign, these being mechanically converted in the apparatus according to FIG. 1 and electrically converted according to FIG. 3. In each case a number of phase shifts according to the change which is instantly required is effected to represent a new state or level of the quantity being monitored. A simple feedback circuit 73', 62', 73' may optionally connect line 73 to VCO62 for the purpose of stabilizing a datum base between output pulses from 65 or 66, or may be otherwise applied as feedback according to various prior art application of feedback.

The detector 45' of FIG. 3 may be the same as the detector 45 of FIG. 1. Filter 41 and the limiter stage 42 are not separately shown since they are to be regarded as included in detector 45'. A pulse separator is coupled to detector 45', which was assumed to be included in the detector 45 of FIG. 1, but is here illustrated separately in order to bring out the feature of an additive and subtractive combination of the output signals useful in a linear integrator and combiner 75, which provides the analog signal to be recorded on the analog recorder 76. It will be understood that pulse formers may be desired, terminating lines 46 and 47 but the function performed in the combiner 75 is linear integration and summing of the outputs received to a particular instant, and that this may be accomplished either electrically or mechanically. In either case the recorder 76 may be employed along with, or in addition to, a utilization circuit such as 50. When it is merely desirable to record remotely an occurrence at the transmitting station, the analog recorder 76 becomes an example of the utilization circuit 50. When the objective is to operate a motor or control arm or to actuate certain guidance mechanisms in a missile, the recorder would be omitted.

Various sensors are known which function to provide an incremental output upon each change of an input analog value from the last preceding value, which may be employed in the circuitry of FIG. 3. As for example a piezoelectric pressure converter is described in "The Electric Control Handbook" by Batcher and Moulic, p. 67, published by Caldwell-Clement, Inc., New York.

A more general form of phase shift system to communicate analog information by repeated like shifts of phase is illustrated in FIG. 5. Typical analog data is illustrated at the input to a transmitter consisting of a suitable form of digital converted and a phase shifting circuit responsive to give an advanced phase for a positive voltage input and a retarded phase for a negative voltage input. Suitable circuitry for converting the input voltage to pulses is known in the art. In its simplest form the apparatus of FIG. 5 receives an increment of voltage of one sign and thereupon triggers a biased voltage-controlled oscillator momentarily to produce a shortened cycle or half cycle of output wave. The voltage controlled oscillator may be a variably biased multivibrator in which only one quasi stable period is shortened by a positive trigger superimposed on a bias voltage while a negative signal lengthens the same period (or shortens the second quasi stable period) according to prior art circuitry adjusted for this purpose. Increments of analog voltage may be converted to pulses in a number of ways, illustrated generally at digitizer 90, and may include reverse-connected delay multivibrators 91, 91' with suitable clamping circuitry to initiate each new pulse from an arbitrarily established zero as of the time of the last output pulse. Thus each new pulse is an isolated positive or negative pulse representing a predetermined incremental magnitude of change of input voltage from the previously developed level. This pulse then triggers a corresponding period of VCO92 to produce an advanced or retarded output phase. Filters F, F' and F'' represent output controls for three frequency channels as from VCO92, 92' and 92''.

Receiver filter 93 passes the appropriate channel frequency corresponding to the steady period of VCO92, which is normally of approximately sine wave form after passing through filter F and the transmission link. Output from filter 93 is limited at 94 in a conventional squaring circuit and is then differentiated at 95, one polarity of differentiated spikes preferably being removed or inverted to provide single polarity pulses. These pulses may be shaped conventionally and broadened by suitable means feeding integrator 96 which produces a useful output in stepped form. Oppositely connected monostable multivibrators 97 and 98 are suitable to produce a squared positive pulse from multivibrator 97 and a negative pulse from multivibrator 98, according to the output from 96. The receiver portion of FIG. 5 may be similar or identical to that of FIGS. 1 and 3.

In FIG. 6 typical transmitter operation is indicated, where curve A is an input voltage converted to pulses as on line B and the output from an oscillator 92 of one type producing square waves is shown on line C wherein positive pulses are assumed to be of constant duration and phase shifts are represented as advanced or retarded initiations of the next succeeding positive pulses. Alternatively, the circuit may operate to shorten or lengthen the conducting period of either sign at the time of the pulse. When wave C is transmitted it is affected by filtering to produce essentially a sine wave at fixed frequency, modified only at the transient intervals when a new phase is being established. Line D illustrates an output wave (or a received wave) having phase shifts as produced by VCO92 after filtering and smoothing during transmission. At $t_1$ a change of sensor voltage commences and reaches an incremental triggering value at $t_2$ whereupon a phase shift is produced and a new arbitrary level $V_2$ becomes effective. At $t_3$ a second incremental value is reached and a second positive phase shift occurs accompanied by a new reference level $V_3$ from which the next increment is measured. At $t_4$ level $V_2$ is again reached and at $t_5$ level $V_3$ is reached, with a negative shift and then a positive shift as shown in C and D. Sensor voltage level at $t_0$ and $t_2$ is shown as $V_1$.

It will be appreciated that the receiver for this system is essentially an integrator with special additions of time constants as needed to assure the integration of phase shifts over one baud length and to sum the discrete signals so produced giving a total voltage as in an integrator not leaked to ground.

The system described has application in servo systems. Servo motors are employed to remotely indicate a quantity developed or sensed at another point in which the servo master and slave units are interconnected by three fixed connections in addition to the power supply furnishing the driving force. Servo motors control the positioning of a response shaft at the slave unit with a degree of accuracy depending upon the distance and the load factor, and the accuracy has not been entirely satisfactory since the slave unit responds to a voltage signal approximately such that the transmitting device does not have absolute control over the positioning of the slave device. According to the present invention control is made absolute within any desired limit of accuracy for the reason that any voltage increment desired may be selected to produce one increment of phase shift. Such a system of servo control by radio does not require the use of closed loop connections between the master and the slave units. Circuitry either of FIG. 1 or of FIG. 3 is suitable for this purpose.

Figure 4:
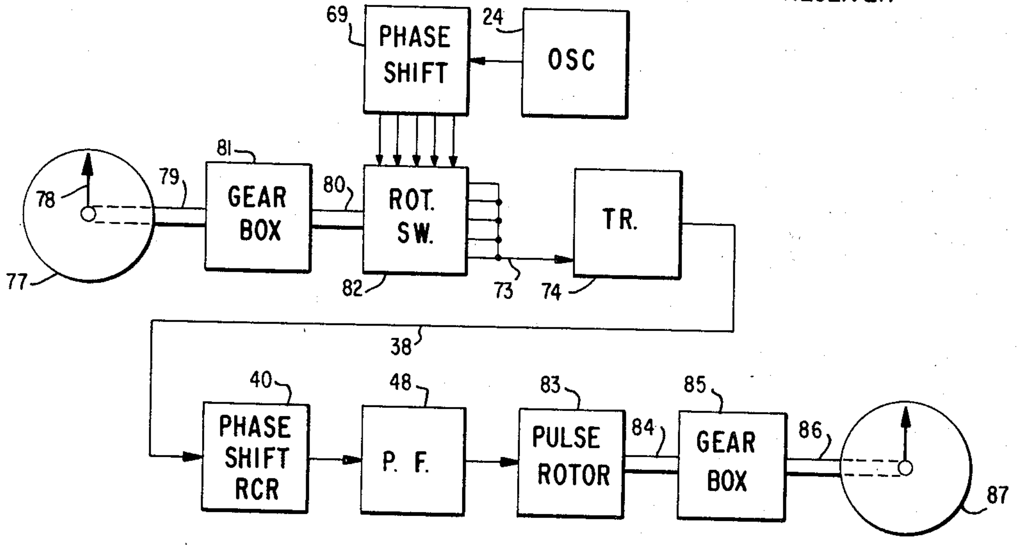
FIG. 4 shows in block diagram one mode of analog representation in amplified digital form.

Illustrative of servo operation by this invention FIG. 4 shows a servo master positioner 77 indicating a sensed quantity at pointer 78. There are provided between the master servo unit and the phase selectro mechanism shafts 79 and 80 and motion multiplying gear box 81 to operate phase switch 82. Oscillator 24, phase shifter 69, switch 82, combining lead 73 and transmitter 74 comprise a transmitter as in FIG. 1 or FIG. 3 except that five like phase intervals per cycle of wave are illustrated in place of three as in the prior figures, either being appropriate according to particular circumstances of use. The transmitter is connected by line 38 to receiver 40 which has an output of positive or negative pulses shaped in pulse shaper 48 to operate a suitable combiner or counter 83 such as a stepped rotary switch or ratcheted wheel equipped for operation in either direction according to the sign of the driving pulse. Provision for periodic synchronism between 77 and 87 may be of a conventional design as desired, not here shown.

A slave unit may have a corresponding gear down from the receiver output as at shaft 84, gear box 85, shaft 86, and responder 87. If one complete revolution of the master unit requires 1000 phase shifts the phase selector of FIG. 1 might have a gear ratio of 33:1. By the employment of a definite phase shift for each incremental bit of information to be transmitted if become possible to render the representation at the receiving station within any prescribed degree of accuracy. The well known difficulty at the receiving station of conventional analog data systems in knowing whether the quantity communicated is correctly represented, or only approximately represented, is thus obviated in this system. By this means a repeater station is provided with data in which definiteness as to representation is assured.

In summary the invention provides analog data in any desired form such as an integrated voltage, a change of voltage from a prior communicated voltage, or a rate of change in the form of increments per second. Such data may be in any electrical form convenient, or may be in a purely mechanical form as in shaft or arm position. Electrical means are employed to select one phase shift, which consists of changing from one output phase to an adjacent one, taken in a direction to indicate the direction of the change in the data value to be transmitted, for incremental data value supplied from the data source. Whenever the data value reaches the next incremental value, a new adjacent phase is selected for the transmitter output, and each phase shift communicates the selected increment of data value for one-to-one registry at the receiver and the total number of such shifts is the quantity read at the receiver in a selected time interval, or between other indicated limits. The total of phase shifts from a reference and the frequency of shifting are thus the two kinds of information needed to display or utilize a variety of data in telecommunications or process control. This is made effective in this invention wherein all shifts are alike, except for direction, and a recorder or integrator has a definitive signal of either the mark or space type to provide definite control of the registered change. Registration is independent of fading and amplitude variation factors, requiring only a counting operation. The signals are alike in respect to resolution, so are not ambigous, and require a minimum of band width for effective registration. The signal-to-noise, ratio is thus maintained at nearly the ideal for any system, and the band width required is near that minimum dictated by the keying rate. By employing phase shifts only, this invention accumulates any desired total, and the one-thousandth increment is on the same scale of resolvability as binary indications, since successive outputs are counted increments rather than integrated totals of uncertain scale factor.

While the invention has been described with respect to particular apparatus which illustrates preferred modes of operation for different purposes according to this invention, it will be appreciated that other apparatus may be employed without departing from the spirit of the invention as herein disclosed and that various modifications are intended, accordingly, to be included within the scope of the appended claims.

What is claimed is:

1. In an analog data transmitting system wherein a single frequency wave is phase modulated in steps to convey data bits, transmitter apparatus, comprising means generating a fixed frequency carrier wave having a plurality of output phase differing by like steps of advancement or retardation, sensing means for producing a voltage output varying according to the magnitude and direction of deviations in analog data sensed, Control signal generating means responsively connected to said sensing means for producing a number of successive positive or negative control pulses according to the magnitude and direction of a said deviation of data sensed, and phase selecting means controlled by said pulses to select for successive transmission a number of phases successively advanced or retarded according to the number of successive positive or negative control signals generated.

2. In a system for transmitting analog data as digital bits, transmitter apparatus comprising means for generating a carrier wave of constant frequency having plural outputs related in $n$ phase components differing by $p$ radians where $n$ is an integer and $np$ equals $2\pi$, means for sensing varying data as a changing voltage, control signal generating means connected to said sensing means to produce positive and negative pulses according to increments of deviation in said data sensed, reversing ring counter means stepped according to polarity of said positive and negative pulses, and gate means controlled by said counter means for selecting a said phase progressing according to pulse sign each time when a said pulse occurs.

3. In a system according to claim 2, said sensing means comprising voltage controlled oscillator means responsively connected for control of the output thereof by said changing voltage, and discriminator means responsively connected to said oscillator means and to said means generating a carrier wave to produce said positive and negative pulses.

4. In an analog data transmitting system wherein a single frequency wave is phase modulated in steps to convey data bits, transmitter apparatus, comprising means generating a fixed frequency carrier wave having a plurality of phases differing by like steps taken in either direction, sensing means for producing a voltage output varying positively and negatively according to the direction of deviation sensed in analog data to be transmitted, control signal generating means responsively connected to said sensing means for producing positive or negative control pulses according to the direction of deviation in said voltage, phase selecting means controlled by said pulses to select for successive transmission a different stepped phase of said wave for each pulse, being advanced or retarded according to the sign of each successive pulse generated.

References Cited

UNITED STATES PATENTS

| | | | |
|---|---|---|---|
| 3,234,330 | 2/1966 | Lee | 178—67 |
| 3,238,459 | 3/1966 | Landee | 340—170 |
| 3,257,508 | 6/1966 | Crafts | 178—67 |
| 2,526,425 | 10/1950 | Schultheis | 340—207 |
| 2,582,957 | 1/1952 | Borsum | 340—207 |
| 2,774,957 | 12/1956 | Towner | 340—205 |
| 3,223,925 | 12/1965 | Florac | 340—207 |

THOMAS B. HABECKER, *Primary Examiner.*